April 4, 1950  C. M. KENNARD  2,503,114
ADVERTISING DEVICE
Filed July 25, 1946
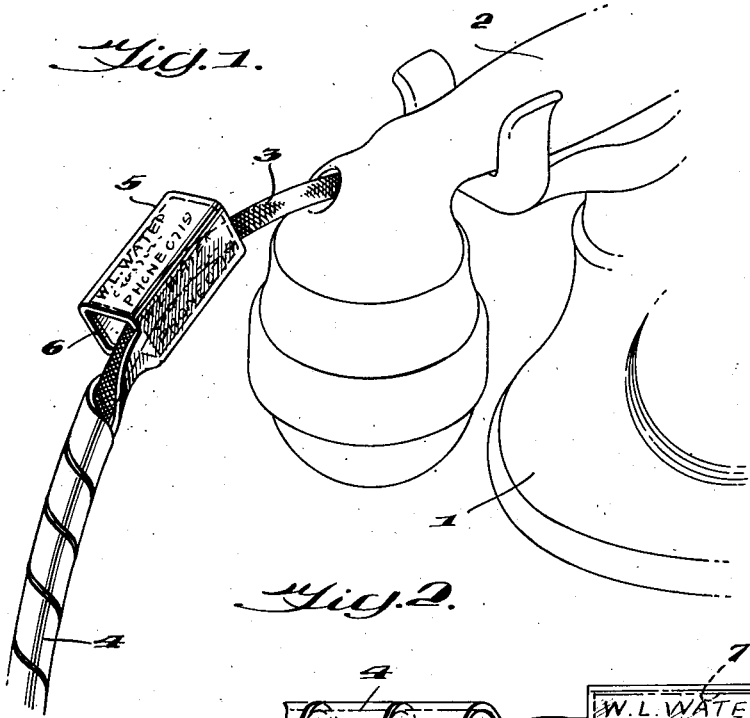
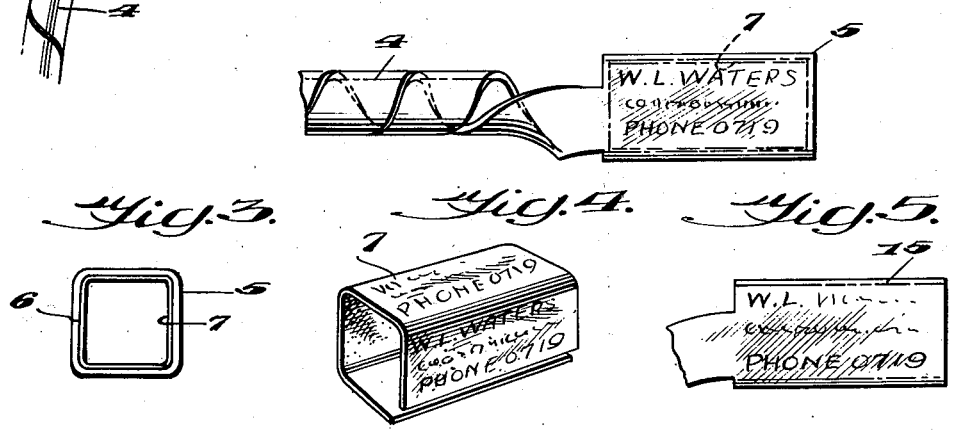
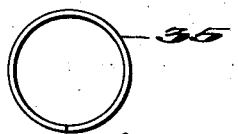
Inventor
Charles M. Kennard
By Cyrus Kehr & Swecker
his Attorneys Patented Apr. 4, 1950

2,503,114

UNITED STATES PATENT OFFICE 2,503,114

ADVERTISING DEVICE

Charles M. Kennard, Knoxville, Tenn.

Application July 25, 1946, Serial No. 686,260

3 Claims. (Cl. 40—10.5)

This invention relates to improvements in advertising devices, particularly for application to telephone receiver cords, which may be applied and secured thereto for advertising purposes.

While advertising has been extended into practically all fields for drawing attention of users of different devices to persons or objects featured in the advertising, one important place for display advertising seems to have been overlooked, namely, a telephone receiver and its connected cord. It has been the practice heretofore to use cord protectors in the form of a coil or helix encircling the cord of a telephone receiver throughout the major portion of its length for the purpose of protecting the cord and preventing its entanglement and twisting. However, such cord protectors have not been used heretofore for advertising purposes.

The object of this invention is to provide an advertising device capable of being applied to a telephone receiver cord for display advertising with means for attaching such advertising display to the cord in a simple and expeditious manner.

A further object of the invention is to combine a display advertising device with a cord protector so constructed as a unit that the protector will extend throughout the major portion of the length of the cord and will hold the advertising device in proximity to the receiver in full view of a person using the instrument for display advertising purposes.

In one embodiment of this invention a cord protector is used formed as a coil or helix, such as may be made from Celluloid or plastic material shaped so as to be applied to the cord and be retained thereon substantially throughout its length. At one end this cord protector is provided with an advertising device which may be made integral therewith and encircle the cord adjacent the receiver in such position as to display advertising matter in close proximity to the instrument for advertising purposes.

This embodiment of the invention is illustrated in the accompanying drawings in which:

Fig. 1 is a perspective view of a portion of a telephone instrument and cord showing the invention applied thereto.

Fig. 2 is a side elevation of a portion of a cord protector and advertising device thereon.

Fig. 3 is an end elevation thereof.

Fig. 4 is a perspective view of an advertising display member that may be applied to the advertising device.

Fig. 5 is a side elevation of the advertising device carrying the advertising material directly thereon.

Figs. 6 and 7 are end elevations of modified forms of the advertising device.

The invention is shown as applied to a telephone instrument of the desk type generally designated by the numeral 1, and provided with the usual hand receiver 2, which forms a combined receiver and transmitter. Connected with the receiver 2 is a cord 3 in which the electric wires are encased through which the electric signals are transmitted to the receiver.

The cord 3 is of substantial length and frequently extends to the instrument 1. A protector may extend over this cord 3 as designated generally by the numeral 4. This protector is shown in the form of a coil or helix which may be made of plastic or Celluloid, plain or colored as desired, or other suitable materials may be provided for the purpose. In applying this protector 4 to the cord 3, the convolutions of the former are separated and the cord slipped into place therebetween as the protector is wound around the cord so as to encase substantially the entire length of the cord. Such a protector will serve not only to prevent injury to the cord, but also to prevent entangling or twisting thereof.

I have provided an advertising device generally designated at 5 which may be polygonal in cross section, round or of other configuration. The advertising device 5 comprises an extension of the cord protector 4 and is open at its opposite ends to permit the extension of a cord 3 therethrough. In the form shown in Figs. 1 to 5, this advertising device is shown as substantially square as indicated at 5 in Figs. 1, 2 and 3, and at 15 in Fig. 5. Other shapes thereof are indicated in Figs. 6 and 7, such as the triangular shape 25 in Fig. 6 and the circular shape 35 in Fig. 7. These shapes are merely illustrative of some variations that may be made in the construction of the advertising device.

The advertising device as shown is formed in one integral piece with the protector 4 and of the same material as said protector to provide a mounting for the advertising device having display devices, and to hold it securely on the cord in position adjacent the receiver 2 to realize the full effect of the display surfaces. This may be done by forming the advertising device from the same sheet that is used to form the protector and bending it to the desired shape. It is preferred that the edges be bent into alignment as indicated in Fig. 3, but should be separable, as at 6, to permit insertion of the cord laterally into the advertising device.

Any suitable means may be used for supporting the advertising material, but as shown in Figs. 1 to 4, a separate advertising display member 7, such as paper, may be used for the purpose and has the desired advertising material printed thereon, so as to be visible through the transparent body of the advertising device 5, as will be evident from Figs. 1 and 2.

If desired, however, the advertising material may be printed directly on the sides of the display surface as shown in Fig. 5. This is practical especially where the display surface is formed of clear, transparent plastic or Celluloid, or contrasting colors may be used for the printed display and the supporting device as desired.

It will be evident that the attachment of the advertising device to the cord protector 4 that is customarily made of such length to extend substantially throughout the length of the cord 3, disposes the advertising material in close proximity to the receiver 2 where it is in full view of a person using the instrument. Therefore, the advertising material is readily available and effective for advertising purposes, and being retained by the cord protector, will be held in place on the cord. It is also capable of manufacture practically at one operation with the cord protector, and therefore, adds very little to the cost thereof while increasing materially the commercial value of such a device.

While the invention has been illustrated and described in certain embodiments, various modifications and changes may be made therein without departing from the invention, the invention being only limited by the scope of the following claims.

I claim:

1. Advertising apparatus comprising a telephone cord protector for telescopically receiving a telephone cord, said telephone cord protector extending over a major portion of the length of said telephone cord, one end of said telephone cord protector being provided with a device for carrying advertising material comprising a tubular extension integrally formed therewith, said tubular extension being open at its opposite ends and provided with an opening extending along the periphery thereof, said opening being positioned substantially parallel to the longitudinal axis of said tubular extension whereby said telephone cord may be laterally inserted in said tubular extension.

2. Advertising apparatus as defined in claim 1, said tubular extension being transparent, and an advertising display member mounted within said tubular extension and disposed intermediate said telephone cord and said tubular extension.

3. Advertising apparatus as defined in claim 1, said tubular extension being transparent, and an advertising display member mounted within said tubular extension and disposed intermediate said telephone cord and said tubular extension, the adjacent faces of said advertising display member and said tubular extension being in substantial engagement.

CHARLES M. KENNARD.

REFERENCES CITED

The following references are of record in the file of this patent:

UNITED STATES PATENTS

| Number | Name | Date |
|---|---|---|
| 1,298,981 | Loughridge | Apr. 1, 1919 |
| 1,380,633 | Brown | June 7, 1921 |

FOREIGN PATENTS

| Number | Country | Date |
|---|---|---|
| 355,908 | Great Britain | Sept. 3, 1931 |
| 447,471 | Great Britain | May 18, 1936 |
| 636,156 | Germany | Oct. 9, 1936 |

OTHER REFERENCES

Electrical Equipment Magazine, Jan. 1944, page 7.